United States Patent
Kaneko et al.

(10) Patent No.: US 11,183,058 B2
(45) Date of Patent: Nov. 23, 2021

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Yusuke Kaneko, Toyota (JP); Junya Masui, Nagoya (JP); Yui Nakamura, Nagoya (JP); Ai Fujimura, Nisshin (JP); Keisuke Tsujimoto, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 16/504,378

(22) Filed: Jul. 8, 2019

(65) Prior Publication Data
US 2020/0013287 A1  Jan. 9, 2020

(30) Foreign Application Priority Data
Jul. 6, 2018  (JP) .............. JP2018-129040

(51) Int. Cl.
*G08G 1/127* (2006.01)
*G07C 5/00* (2006.01)

(52) U.S. Cl.
CPC ............. *G08G 1/127* (2013.01); *G07C 5/008* (2013.01)

(58) Field of Classification Search
CPC ................. G08G 1/127; G07C 5/008

USPC ........................................... 701/117
See application file for complete search history.

(56) References Cited

U.S. PATENT DOCUMENTS

| | | | |
|---|---|---|---|
| 2006/0206261 A1* | 9/2006 | Altaf ................ | G01C 21/3626 701/533 |
| 2014/0038640 A1 | 2/2014 | Wesselius et al. | |
| 2014/0051465 A1 | 2/2014 | Ruys et al. | |
| 2015/0046080 A1 | 2/2015 | Wesselius et al. | |
| 2017/0017235 A1* | 1/2017 | Tanaka ................ | G05D 1/0027 |
| 2017/0351990 A1 | 12/2017 | Hecht et al. | |

FOREIGN PATENT DOCUMENTS

| | | |
|---|---|---|
| CN | 106373331 A | 2/2017 |
| JP | 2010-014487 A | 1/2010 |
| JP | 2018-032427 A | 3/2018 |
| JP | 2018-055538 A | 4/2018 |

* cited by examiner

*Primary Examiner* — Gertrude Arthur Jeanglaude
(74) *Attorney, Agent, or Firm* — Oliff PLC

(57) ABSTRACT

An information processing apparatus comprises a control unit configured to: acquire information about a predetermined travel route of a vehicle that travels with a plurality of users on board; acquire a current position of the vehicle; compare the current position of the vehicle and the predetermined travel route against each other, and perform determination as to whether the vehicle is traveling along the predetermined travel route or not; and issue a notification to a predetermined device, in a case where a deviation of the vehicle from the predetermined travel route is determined.

8 Claims, 9 Drawing Sheets

RESERVATION TABLE

| RESER- VATION ID | DRIVER INFORMATION | | PASSENGER INFORMATION | | | | | SCHEDULED TRAVEL ROUTE | STATUS |
|---|---|---|---|---|---|---|---|---|---|
| | DRIVER ID | VEHICLE INFOR- MATION | PASSEN- GER ID | BOARDING LOCATION | SCHEDULED BOARDING DATE/TIME | ALIGHTING LOCATION | SCHEDULED ALIGHTING DATE/TIME | | |
| R001 | U001 | ... | U011 | ... | ... | ... | ... | ... | ON BOARD |
| R002 | U002 | ... | U012 | ... | ... | ... | ... | ... | BEFORE BOARDING |
| | | | U013 | ... | ... | ... | ... | ... | ALIGHTED |
| ... | ... | ... | ... | | | | | | |

FIG. 5

INFORMATION PROCESSING APPARATUS AND INFORMATION PROCESSING METHOD

CROSS REFERENCE TO THE RELATED APPLICATION

This application claims the priority of Japanese Patent Application No. 2018-129040, filed on Jul. 6, 2018, which is hereby incorporated by reference herein in its entirety.

BACKGROUND

Technical Field

The present disclosure relates to a technology for allowing a plurality of users to move by riding in a same car.

Description of the Related Art

A mode in which a plurality of occupants move by sharing a ride in one vehicle (ride-sharing) is becoming widespread especially in countries outside Japan, for the purpose of alleviating traffic congestion and saving fuel costs, and as an environmental measure, for example.

A technology for matching a plurality of users is being developed in relation to such a mode of transport.

In relation to such a technology, US2017/0351990A1 describes a system that acquires data regarding an interaction performed between a plurality of users who moved by sharing a ride on a vehicle, and that further provides information based on the interaction.

SUMMARY

In general ride-sharing, strangers ride in a same vehicle to move, and thus, there is a demand to let a user riding in a vehicle know whether the vehicle is traveling on a correct route or not, to enable more comfortable use of ride-sharing.

The present disclosure has been made in view of such circumstances, and has its object to examine adequacy of a travel route of a vehicle in a mode in which a plurality of users move by a same vehicle.

The present disclosure in its one aspect provides an information processing apparatus comprising a control unit configured to: acquire information about a predetermined travel route of a vehicle that travels with a plurality of users on board; acquire a current position of the vehicle; compare the current position of the vehicle and the predetermined travel route against each other, and perform determination as to whether the vehicle is traveling along the predetermined travel route or not; and issue a notification to a predetermined device, in a case where a deviation of the vehicle from the predetermined travel route is determined.

The present disclosure in its second aspect provides an information processing method for causing an information processing apparatus to perform the steps of acquiring information about a predetermined travel route of a vehicle that travels with a plurality of users on board; acquiring a current position of the vehicle; comparing the current position of the vehicle and the predetermined travel route against each other, and performing determination as to whether the vehicle is traveling along the predetermined travel route or not; and issuing a notification to a predetermined device, in a case where a deviation of the vehicle from the predetermined travel route is determined.

A third aspect of the present disclosure is a program for causing a computer to execute the information processing method described above, or a non-transitory computer-readable storage medium storing the program.

According to the present disclosure, adequacy of a travel route of a vehicle may be examined in a mode in which a plurality of users move by a same vehicle.

BRIEF DESCRIPTION OF THE DRAWINGS

FIG. 5 is an example of a reservation table according to the first embodiment;

DESCRIPTION OF THE EMBODIMENTS

Figure 1:
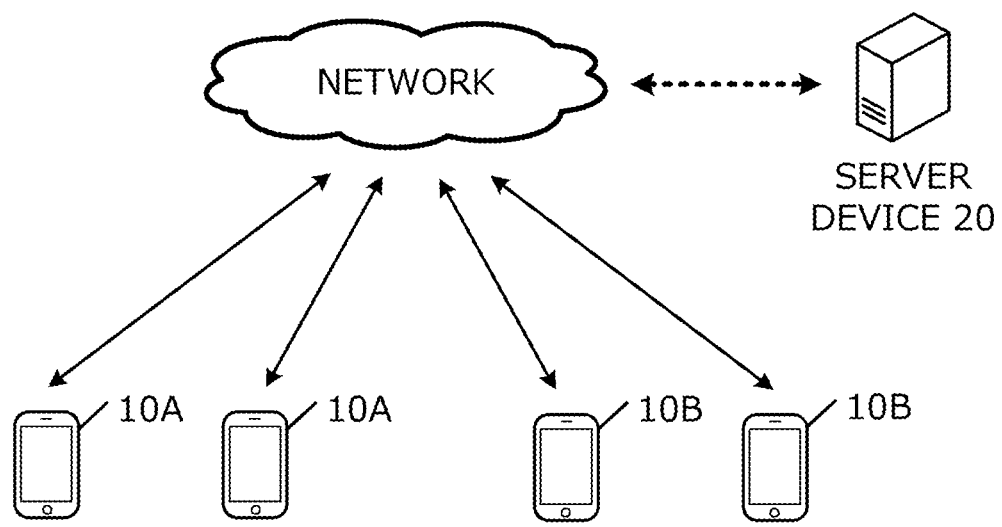
FIG. 1 is a schematic configuration diagram of a ride-sharing system according to a first embodiment.

The present disclosure relates an information processing apparatus that exchanges various pieces of information with a user terminal used by each user, in a mode in which a plurality of users share a ride in a same vehicle (ride-sharing).

An information processing apparatus according to a first aspect of the present disclosure acquires information about a predetermined travel route of a vehicle that travels with a plurality of users on board, and determines whether the vehicle is traveling along the predetermined travel route or not, based on a result of comparison between a current position of the vehicle and the predetermined travel route.

The predetermined travel route is a travel route that is planned in advance. The route may include boarding locations and alighting locations of a plurality of users.

In the case where a plurality of users move by riding in a same vehicle, various locations are passed through, and it is difficult for a user on board to determine whether the vehicle is traveling along a correct route.

Accordingly, the information processing apparatus according to the first aspect of the present disclosure compares the current position of the vehicle and the predetermined travel route, and determines whether the vehicle is traveling on a scheduled route or not, and then, in a case where a deviation of the vehicle from the predetermined travel route is determined, the information processing apparatus issues a notification to a predetermined device.

For example, whether the vehicle is traveling on a scheduled route or not may be determined based on a degree of coincidence between the predetermined travel route and an actual travel route of the vehicle, or may be determined based on whether a predetermined scheduled location (such as an alighting location of a user) may be reached in time or not.

According to such a configuration, whether the vehicle is traveling on a correct route or not may be determined, and a user may receive a notification in a case where there is a deviation from the route.

Additionally, there may be a specific margin with respect to determination of a deviation. For example, even when an initial route is rerouted, if a destination may be reached within a reasonable time, it may be determined that there is no deviation.

Additionally, the predetermined device may be a device that manages a ride-sharing system or a vehicle, or may be a mobile terminal possessed by a user on board. It may alternatively be an in-vehicle device that is mounted in a vehicle.

Furthermore, a degree of deviation that is a value indicating a degree of deviation of the vehicle from the predetermined travel route may be acquired, and whether there is a deviation from the route or not may be determined based on whether the degree of deviation exceeds a predetermined threshold or not.

This is because, in the case where the degree of deviation is lower than the threshold, the route may be assumed to have been changed for a good reason, such as avoidance of congestion.

Furthermore, the predetermined threshold may include a first threshold, and a second threshold higher than the first threshold, and in a case where the degree of deviation is at or higher than the first threshold and lower than the second threshold, the vehicle may be determined to be in a first state, and in a case where the degree of deviation is at or higher than the second threshold, the vehicle may be determined to be in a second state.

In this manner, whether a deviation is a small deviation or not may be determined by providing two thresholds for the degree of deviation. According to such a configuration, different processes may be performed depending on the degree of deviation.

For example, notification may be performed by a different method between a case where the vehicle is in the first state and a case where the vehicle is in the second state. This enables an operation of urging correction of the route by issuing a visual notification in a case where the deviation is small, and of issuing an alarm in a case where an utter deviation is determined, for example.

Furthermore, the notification may be transmitted to a different device between a case where the vehicle is in the first state and a case where the vehicle is in the second state. This enables an operation of issuing a notification only inside the vehicle (in-vehicle terminal, mobile terminal possessed by a driver or an occupant of the vehicle, etc.) in a case where the deviation is small, and of issuing a notification to a system administrator in a case where an utter deviation is determined, for example.

The degree of deviation may be calculated based on a rate of increase/decrease in an estimated required time until an alighting location of the user, present on the predetermined travel route, is reached.

For example, in a case where rerouting is performed to avoid congestion, the estimated required time until an alighting location of a user is reached is temporarily increased, but is then reduced. On the other hand, when the vehicle starts to travel on an unrelated route, the estimated required time until the alighting location of the user is reached is expected to continue increasing or is expected not to be reduced. Accordingly, the degree of deviation may be appropriately determined based on transition of the estimated required time until an alighting location is reached.

In the following, specific embodiments of the present disclosure will be described with reference to the drawings. A hardware configuration, a module configuration, a functional configuration and the like described in each embodiment are not intended to limit the technical scope of the disclosure to such configurations unless specified otherwise.

First Embodiment

Figure 9:
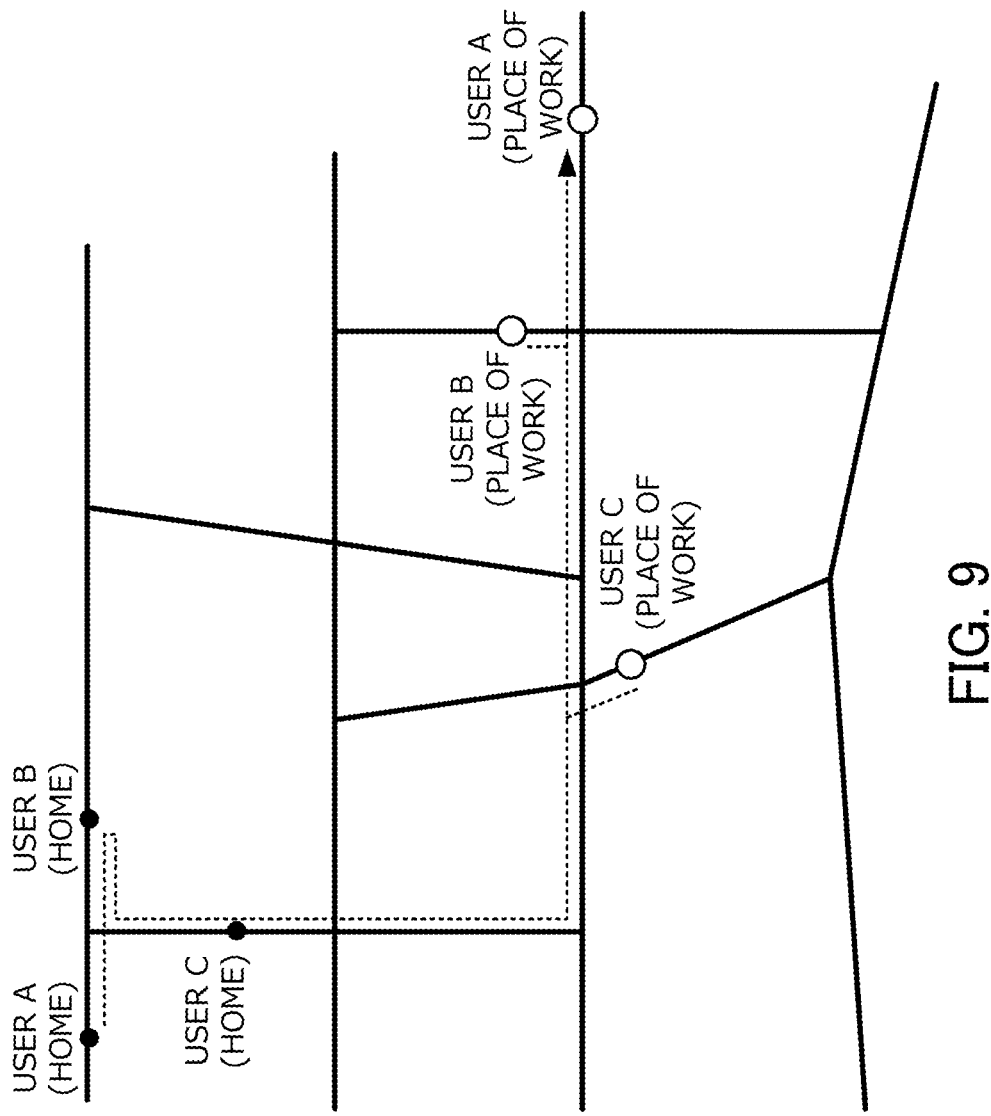
FIG. 9 is a diagram giving an outline of ride-sharing.

First, an outline of a ride-sharing system according to a first embodiment will be given. FIG. 9 is a diagram for describing ride-sharing as a mode of transport by which users move by sharing a ride. FIG. 9 is a diagram illustrating locations of homes and places of work for a case where there are three users who are to commute.

If the users are to separately commute, three vehicles have to be used, but when ride-sharing is performed, the number of traveling vehicles may be reduced. For example, homes and places of work of a user A, a user B, and a user C are close to one another, and thus, if clock-in times or clock-out times are close to one another, ride-sharing may be performed.

The number of vehicles traveling on a road may be reduced by such ride-sharing, and traffic congestion may thereby be suppressed. Moreover, for example, when the users of the vehicle share and bear traffic costs (such as fuel costs) of movement by the vehicle (cost-sharing), the traffic costs per user may be reduced compared to a case of each user moving by his/her own vehicle.

A schematic configuration of the ride-sharing system according to the first embodiment is illustrated in FIG. 1. The ride-sharing system according to the present embodiment includes a user terminal 10 carried by a user, and a server device 20.

In the present embodiment, a user who drives a vehicle will be referred to as a driver user, and a user who rides in the vehicle driven by the driver user will be referred to as a passenger user.

The user terminal 10 may be switched between a mode of use by the passenger user (hereinafter "first mode"), and a mode of use by the driver user (hereinafter "second mode"). In the following, the user terminal 10 operating in the first mode will be referred to as a user terminal 10A as necessary. Moreover, the user terminal operating in the second mode will be referred to as a user terminal 10B. In the case where the modes do not have to be distinguished from each other, a collective term of "user terminal(s) 10" will be used. Details of operation in each mode will be given later.

A passenger user registers, through the user terminal 10A, information about conditions and the like for ride-sharing in the server device 20. Information to be registered in the server device by the passenger user includes a departure point, a destination, a desired vehicle riding date/time, and a desired alighting date/time of the passenger user, for example.

Moreover, like the passenger user, the driver user registers, through the user terminal 10B, information about conditions and the like for ride-sharing in the server device 20. Information to be registered in the server device by the driver user includes information about movement of a vehicle that is driven by the driver user, and includes a departure point, a destination, a drive start date/time, a scheduled arrival date/time, and a travel route of the driver user, for example.

In the following, information about movement of the passenger user will be referred to as a movement schedule, and information about traveling of the vehicle of the driver user will be referred to as a travel schedule. These will be collectively referred to as "schedule(s)".

For example, these pieces of information are generated by application software, installed in the user terminal 10, for using the ride-sharing service, and are registered in the server device 20. However, these pieces of information do not necessarily have to be registered using a mobile terminal. For example, registration may be performed by using an arbitrary terminal (such as a smartphone, a mobile phone, a tablet terminal, a personal digital assistant, or a wearable computer) or a personal computer that can be connected to a network.

The server device 20 acquires the schedules from the passenger user and the driver user, and provisionally determines a combination of passenger user and driver user based on the schedules transmitted from the users. Then, the determined information is transmitted to the user terminals 10A and 10B, and acceptance is requested. When information indicating acceptance of conditions for ride-sharing is received from the user terminals 10A and 10B, the server device 20 settles the combination of users. In the following description, a process of the server device 20 generating a combination of users by the procedure described above will be referred to as a matching process.

A route of the vehicle that is driven by the driver user (hereinafter "scheduled travel route"), a location where the passenger user is to board (hereinafter "boarding location"), a location where the passenger user is to alight (hereinafter "alighting location") and the like are determined by the matching process.

Information that is obtained as a result of matching (hereinafter "matching information") is transmitted to the user terminal 10A and the user terminal 10B. For example, the matching information includes information about the vehicle that is driven by the driver user (type of vehicle, color, license plate information, etc.), information about the passenger user and the driver user (gender, age, etc.), information about movement (boarding location, alighting location, scheduled boarding time, scheduled alighting time, movement route, presence/absence of another passenger, cost of movement, etc.), and the like. When each user who acquired the matching information accepts the matching, matching between the passenger user and the driver user is settled. A user who drives the vehicle and a user who wants a lift may thereby join each other and move.

In the ride-sharing system according to the present embodiment, the user terminal 10A, the user terminal 10B, and the server device 20 are interconnected by a network. As the network, a wide area network (WAN), which is a worldwide public communication network such as the Internet, or other communication networks may be adopted, for example. Furthermore, the network may include a telephone communication network for mobile phones, or a wireless communication network such as Wi-Fi (registered trademark), for example.

Hardware Configuration

Figure 2:
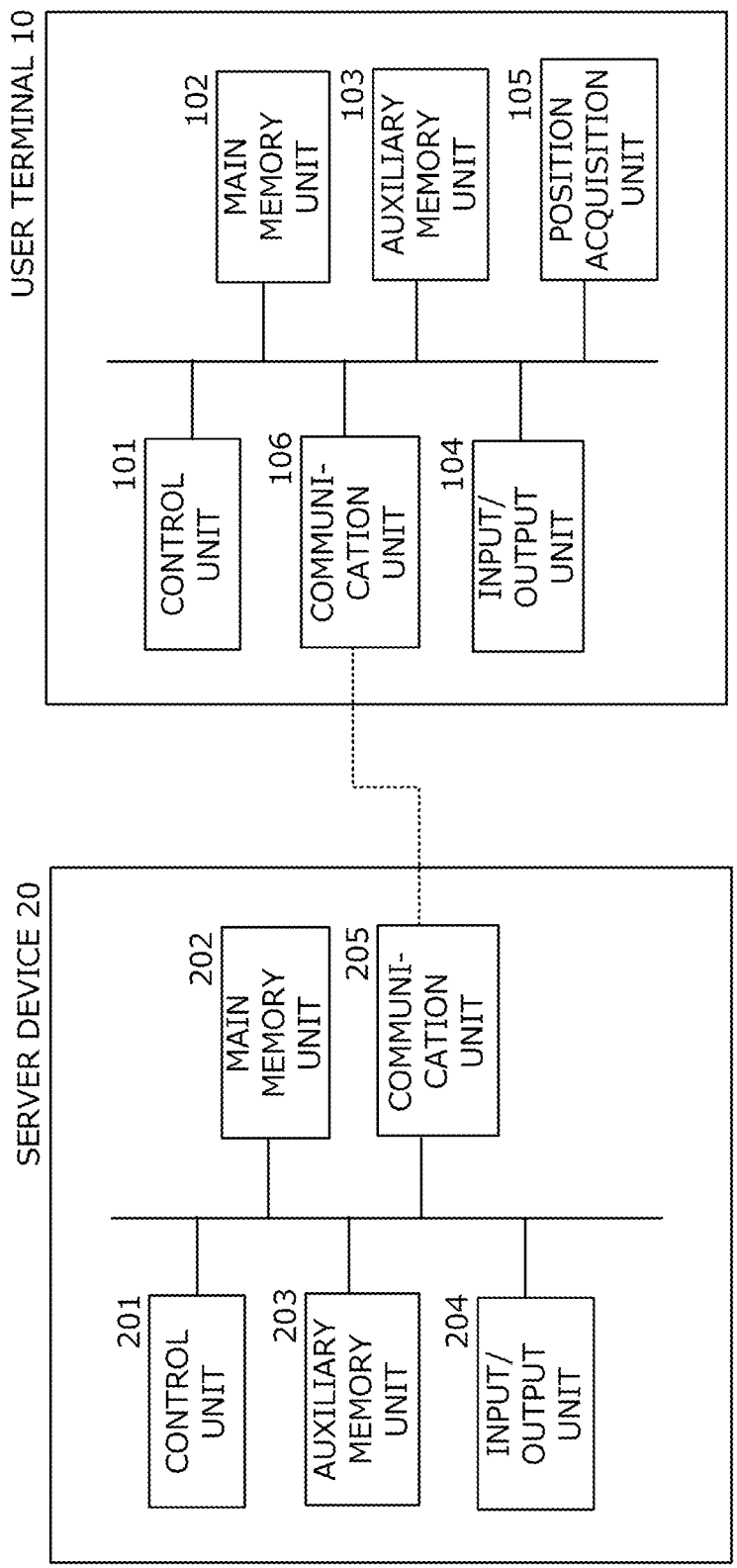
FIG. 2 is a hardware configuration diagram of a user terminal 10 and a server device 20.

Next, a configuration of the user terminal 10 will be described. FIG. 2 is a diagram illustrating a hardware configuration of the user terminal 10 and the server device 20.

For example, the user terminal 10 is a small computer such as a smartphone, a mobile phone, a tablet computer, a personal digital assistant, a laptop computer, or a wearable computer (such as a smartwatch). The user terminal 10 includes a control unit 101, a main memory unit 102, an auxiliary memory unit 103, an input/output unit 104, a position acquisition unit 105, and a communication unit 106.

The control unit 101 is an arithmetic device that is in charge of control that is performed by the user terminal 10.

The control unit 101 may be implemented by an arithmetic processing device such as a central processing unit (CPU).

The main memory unit 102 is a memory where programs to be executed by the control unit 101, and data to be used by the control programs are developed.

The auxiliary memory unit 103 is a device storing programs to be executed by the control unit 101, and data to be used by the control programs. The auxiliary memory unit 103 may store an application packaging programs to be executed by the control unit 101. An operating system for executing the applications may also be stored. A process described later is performed by programs stored in the auxiliary memory unit 103 loaded into the main memory unit 102 and executed by the control unit 101.

The main memory unit 102 may include a random access memory (RAM) and a read only memory (ROM). The auxiliary memory unit 103 may include an erasable programmable ROM (EPROM) and a hard disk drive (HDD). The auxiliary memory unit 103 may further include a removable medium, or in other words, a removable recording medium. The removable medium is a universal serial bus (USB) memory, or a disk recording medium such as a compact disc (CD) or a digital versatile disc (DVD), for example.

The input/output unit 104 is a unit that receives an input operation performed by a user, and that presents information to the user. In the present embodiment, the input/output unit 104 is one touch panel display. That is, the input/output unit 104 includes a liquid crystal display and control unit therefor, and a touch panel and control unit therefor.

The position acquisition unit 105 is a unit that acquires a current position (such as a latitude and a longitude) of the user terminal 10 from a GPS module provided in the device.

The communication unit 106 is a wireless communication interface for connecting the user terminal 10 to a network. For example, the communication unit 106 provides access to a network through a mobile communication service such as a wireless LAN, 3G, or LTE.

Next, a hardware configuration of the server device 20 will be described.

The server device 20 is a general computer. That is, the server device 20 is a computer including a processor such as a CPU or a GPU, main memories such as a RAM and a ROM, and auxiliary memories such as an EPROM, a hard disk drive, and a removable medium. Additionally, the removable medium may be a USB memory, or a disk recording medium such as a CD or a DVD, for example.

The server device 20 includes a control unit 201, a main memory unit 202, an auxiliary memory unit 203, an input/output unit 204, and a communication unit 205.

The auxiliary memory unit 203 of the server device 20 stores an operating system (OS), various programs, various tables, and the like, and each function matching a predetermined object as described later may be implemented by loading a program stored in the auxiliary memory unit 203 into a work area of the main memory unit 202 and executing the program by the control unit 201.

The control unit 201, the main memory unit 202, and the auxiliary memory unit 203 are the same as those of the user terminal 10, and a detailed description thereof is omitted.

The input/output unit 204 is a unit that receives an input operation performed by a system administrator, and that presents information to the system administrator. The input/output unit 204 includes a display device, a keyboard, a pointing device, and the like, for example.

The communication unit 205 is a communication interface for connecting the server device 20 to a network. The communication unit 205 includes a network interface board, and a wireless communication circuit for wireless communication, for example.

Additionally, the configuration illustrated in FIG. 2 is merely an example, and all or a part of the functions illustrated may be implemented by a circuit which is exclusively designed. Moreover, programs may be stored or executed by a combination of main memory and auxiliary memory other than those illustrated.

Furthermore, a part or all of the functions illustrated may be implemented by a hardware circuit such as an ASIC or an FPGA. Moreover, the server device 20 may be a single computer, or may be a plurality of computers that operate in conjunction with each other.

Functional Configuration

Next, a functional configuration of the user terminal 10 and the server device 20 will be described.

Figure 3:
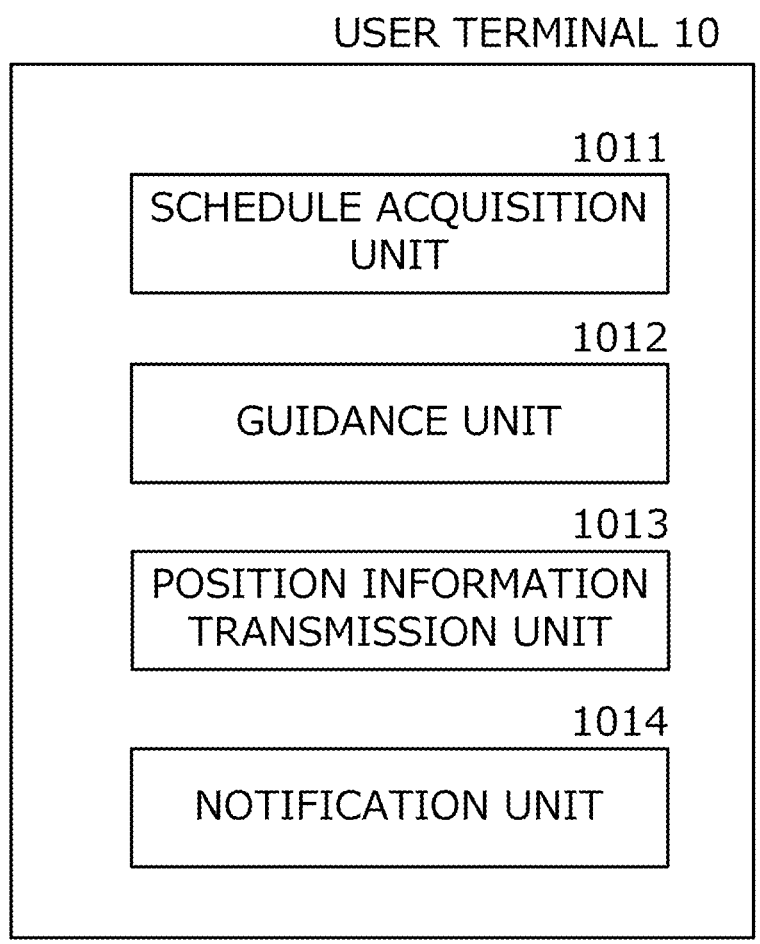
FIG. 3 is a functional configuration diagram of the user terminal 10 according to the first embodiment.

FIG. 3 is a diagram illustrating functional modules implemented by the user terminal 10. The user terminal 10 according to the present embodiment includes, as functional modules, a schedule acquisition unit 1011, a guidance unit 1012, a position information transmission unit 1013, and a notification unit 1014. Each functional module may be implemented by execution of a stored program by the CPU.

The schedule acquisition unit 1011 acquires information about movement of a user. The schedule acquisition unit 1011 acquires the travel schedule or the movement schedule depending on the mode of the user terminal 10.

Specifically, in the case where the user terminal 10 is in the first mode (that is, a mode for the passenger user), pieces of information about a departure point and a destination of the passenger user, date/time when movement is to be started, and the like are acquired. These pieces of information are transmitted to the server device 20 as the movement schedule, together with information about the passenger user.

In the case where the user terminal 10 is in the second mode (that is, a mode for the driver user), pieces of information about a departure point and a destination of the driver user, date/time when driving of the vehicle is to be started, a travel route, and the like are acquired. These pieces of information are transmitted to the server device 20 as the travel schedule, together with information about the driver user.

The server device 20 performs matching between a plurality of pieces of user information (i.e., matching between a user who drives a vehicle and a user who is to ride in the vehicle), and transmits the matching information that is obtained as a result to the user terminals 10 possessed by corresponding users.

The guidance unit 1012 provides the user with information about driving of the vehicle, based on the matching information transmitted from the server device 20. Specifically, in the case where the user terminal 10 is in the first mode, a notification is issued via the input/output unit 104, regarding a boarding location, an alighting location, a drive route of the vehicle, information about the driver user, information about other passengers, features of the vehicle, and the like. In the case where the user terminal 10 is in the second mode, a notification is issued via the input/output unit 104, regarding information about the passenger user, a boarding location and an alighting location of each passenger user, and the like.

In the case where there is a request from the server device 20, the position information transmission unit 1013 acquires a current position of the terminal via the position acquisition unit 105, and transmits the current position to the server device 20.

The notification unit 1014 issues a notification indicating a deviation of the vehicle being driven from a scheduled route, based on information transmitted from the server device 20.

Specific processing details will be given later.

Figure 4:
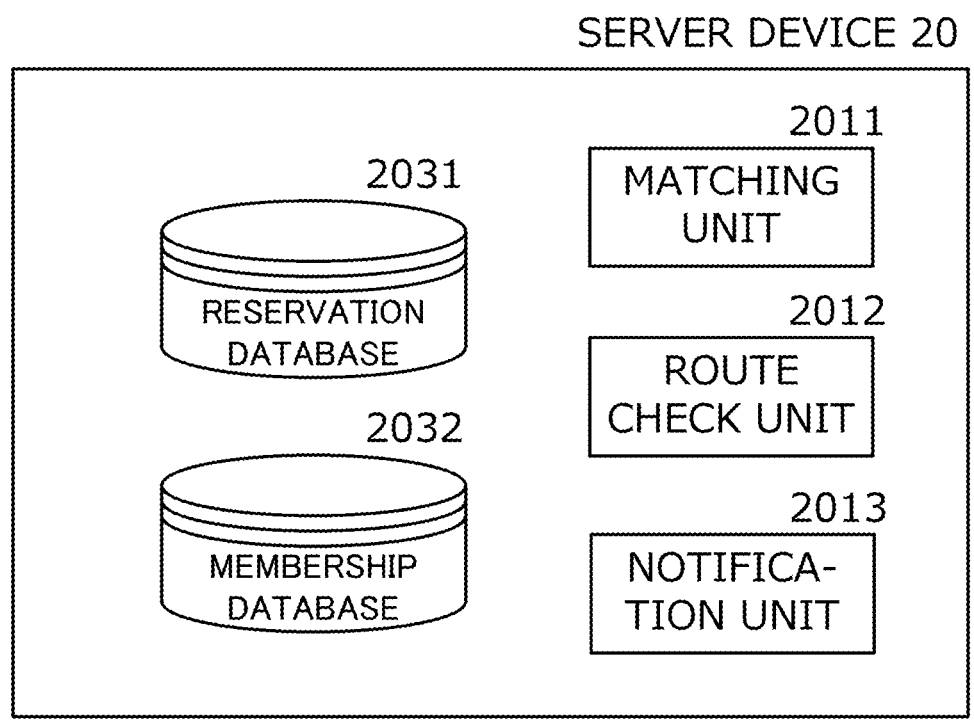
FIG. 4 is a functional configuration diagram of the server device 20 according to the first embodiment.

FIG. 4 is a diagram illustrating functional modules implemented by the server device 20. The server device 20 according to the present embodiment includes, as functional structural elements, functional modules including a matching unit 2011, a route check unit 2012, a notification unit 2013, a reservation database 2031, and a membership database 2032. Each functional module may be implemented by execution of a stored program by the CPU.

The reservation database 2031 and the membership database 2032 are structured by management of data stored in the auxiliary memory unit 203, by programs of a database management system executed by the control unit 201. These databases may be relational databases.

The reservation database 2031 is a database storing reservation information for the ride-sharing service. Specifically, information about the driver user and information about the passenger user who is scheduled to ride in the vehicle that is driven by the driver user are associated with each other.

An example of the reservation information stored in the reservation database 2031 will be described with reference to FIG. 5. FIG. 5 is a diagram illustrating a structure of a table (reservation table) in the reservation database. Additionally, information registered in the reservation table is not limited to the example illustrated in FIG. 5, and fields may be added, changed, or deleted as appropriate.

The reservation table includes fields of a reservation ID, a user ID of a driver, vehicle information, a user ID of a passenger, a boarding location, a scheduled boarding date/time, an alighting location, a scheduled alighting date/time, a scheduled travel route, and a status.

The reservation ID field stores an identifier for uniquely identifying a reservation.

The driver ID field stores a user ID of a user (driver user) who drives a vehicle which can be used for ride-sharing. In the same manner, the passenger ID field stores a user ID of a user (passenger user) who is to receive a lift. Additionally, a plurality of passengers may be associated with one reservation (for example, R002).

The vehicle information field stores information about the vehicle that is driven by the driver user. Information about a vehicle may be information about a type of the vehicle, a registration number (license plate information), a color of a vehicle body, and the like, or may be only an identifier of the vehicle.

The boarding location field stores information indicating a location where the passenger user gets on the vehicle that is driven by the driver user. The alighting location field stores information indicating a location where the passenger user gets off the vehicle. The boarding location and the alighting location may be expressed in latitude and longitude, or in any format as long as the location may be identified. For example, an address may be used, or a name of a landmark may be used.

The scheduled boarding date/time field stores information indicating a scheduled date/time of boarding of the passenger user at a corresponding boarding location. The scheduled alighting date/time field stores information indicating a scheduled date/time of alighting of the passenger user.

The scheduled travel route field stores information indicating a scheduled route on which the vehicle that is driven by the driver user travels (hereinafter "scheduled travel route"). The scheduled travel route is information for identifying the travel route of the vehicle that is driven by the driver user. For example, the scheduled travel route may be expressed by a set of nodes or links of a road network, or by a set of locations to be passed. The scheduled travel route is determined based on a result of matching described later.

The status field stores information indicating a ride-sharing situation. For example, in the case where the passenger is not yet on board, a value indicating "before boarding" is stored. In the case where the passenger is on board, a value indicating "on board" is stored, and in the case where the passenger already alighted, a value indicating "alighted" is stored.

The membership database 2032 is a database storing information of a user who is registered as a member for the ride-sharing service. The membership database stores information about contact information, attributes, and a vehicle of a member in association with the user ID, for example. The contact information of a member is an email address or a telephone number, for example. The attributes of a member are a name, a handle name, age, gender, occupation, and the like. These pieces of information may also be used in matching. Information used by a user to perform authentication may further be registered in the membership database. License plate information, the type of the vehicle, and color may be registered as the information about a vehicle, or a vehicle ID may be registered as the information, for example. Moreover, in the case where a corresponding user does not own a vehicle, information indicating the fact may be registered.

Next, the matching unit 2011 will be described.

The matching unit 2011 performs matching between users based on the movement schedule transmitted from a passenger user and the travel schedule transmitted from a driver user.

A matching process according to the present embodiment is a process of combining a passenger user and a driver user such that the passenger user may move to a destination by boarding a vehicle that is driven by the driver user.

Matching is performed based on the travel schedule of the vehicle that is driven by the driver user and the movement schedule of the passenger user.

Specifically, the movement schedule transmitted from the user terminal 10A of the passenger user and the travel schedule transmitted from the user terminal 10B of the driver user are received, and matching between appropriate schedules is performed by comparing the travel schedule of the driver user and the movement schedule of the passenger user.

For example, in the case where the departure point and the destination of the passenger user are on the travel route of the vehicle that is driven by the driver user, and the users' respective movement dates/times coincide, the passenger user and the driver user are matched.

The scheduled travel route of the vehicle that is driven by the driver user is settled by the matching.

Additionally, in the case where a route is included in the travel schedule, the scheduled travel route may be generated based on the route, or in the case where a route is not provided by the driver user, the matching unit 2011 may dynamically generate the scheduled travel route. In the case of generating the scheduled travel route, a route which is predicted to achieve fastest movement may be selected based on predicted congestion information, traffic regulation information or the like, and the selected route may be set as the scheduled travel route.

Matching may be established on condition of acceptance by the user. In this case, a provisional matching result may be transmitted to the user terminals 10A and 10B, and matching may be formally established when accepted by all the users.

When matching is formally established, the matching unit 2011 generates matching information. The matching information includes, in addition to information about whether matching may be established or not, personal information about a matching counterpart (such as a name, a telephone number, and an email address), for example.

The matching information further includes the boarding location and the alighting location of at least one passenger user, a scheduled route, information about the passenger user and the driver user, features of the vehicle, and the like.

The generated matching information is transmitted to the user terminal 10A and the user terminal 10B, and is presented to the users through the guidance units 1012. Personal information about the matching counterpart is thereby provided to the passenger user and the driver user for whom matching is established. The passenger user and the driver user for whom matching is established are thereby enabled to contact each other.

When matching is established, the matching unit 2011 stores relevant information in the reservation database.

Additionally, the method of performing the matching process by the matching unit 2011 is not limited to the method described above, and the matching process may be performed by other methods using known techniques.

After matching is established, and the passenger user and the driver user start moving, the route check unit 2012 checks whether the vehicle is traveling along the scheduled route or not. In the present embodiment, position information of the user terminal 10 is periodically collected, and a degree of coincidence between the actual travel route of the vehicle and the scheduled travel route is calculated, and a notification is issued in the case where a deviation of the vehicle from the scheduled travel route is determined based on the result of calculation.

The notification unit 2013 is a unit that issues a notification in the case where a deviation of the vehicle from the scheduled travel route is determined. A specific method will be described later.

Processing Flow

Figure 6:
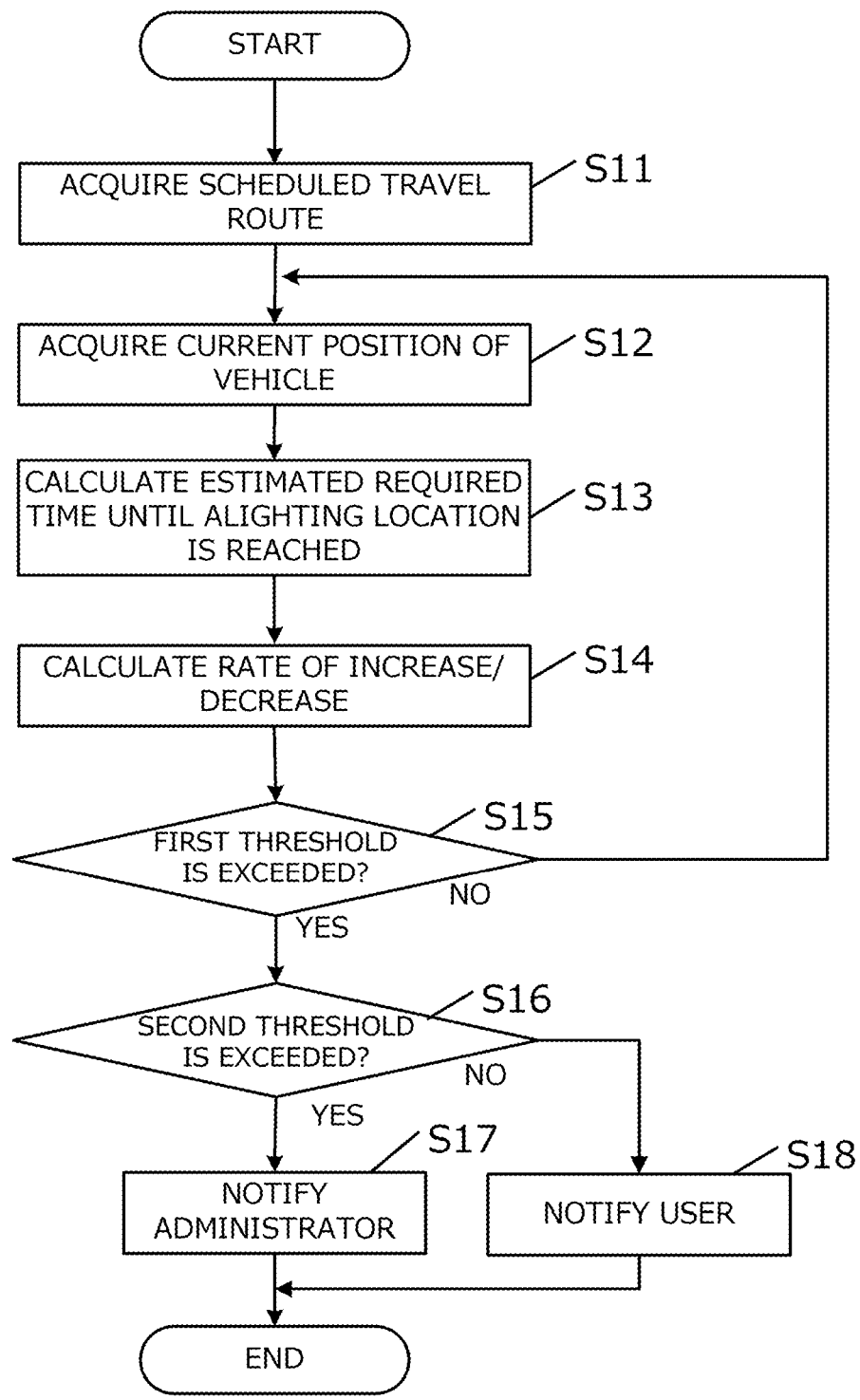
FIG. 6 is a flowchart of a process for determining a deviation from a route.

Next, details of the process that is performed by the server device 20 in the ride-sharing system according to the first embodiment will be given. FIG. 6 is a flowchart of a process that is performed during traveling of a vehicle which a driver user and a passenger user are riding.

The illustrated process is performed by the route check unit 2012 in a case where the status in the reservation table is "on board".

First, in step S11, the scheduled travel route of the vehicle is acquired. The scheduled travel route of the vehicle may be acquired by referring to the reservation database (reservation table).

Next, in step S12, the current position of the vehicle is acquired. The current position of the vehicle may be identified by collecting position information from the user terminal 10 possessed by a user who is on board the vehicle. Specifically, a user who is on board the vehicle is identified by referring to the reservation database, and the user terminal 10 possessed by the user is identified by referring to the membership database. Then, the position information transmission unit 1013 of the corresponding user terminal 10 is requested to transmit the position information, and the position information which is transmitted in response to the request is collected.

Additionally, the current position of the vehicle may be determined based on the position information of the user terminal 10B possessed by the driver user, or may be determined based on a plurality of pieces of position information collected from a plurality of user terminals 10. The acquired current position of the vehicle is temporarily stored.

Next, in step S13, an estimated required time until the location where the passenger user is scheduled to alight is reached is calculated. In the case where there are a plurality of passenger users, the process may be performed taking one of the passenger users as a target, or a plurality of estimated required times may be calculated and a representative value may be determined.

Estimation of the required time may be performed by a known method. The calculated estimated required time is temporarily stored in a time-series format. For example, n estimated required times calculated between n time steps before and a current time are stored.

Next, in step S14, a rate of increase/decrease in the estimated required time is calculated.

Figure 7:
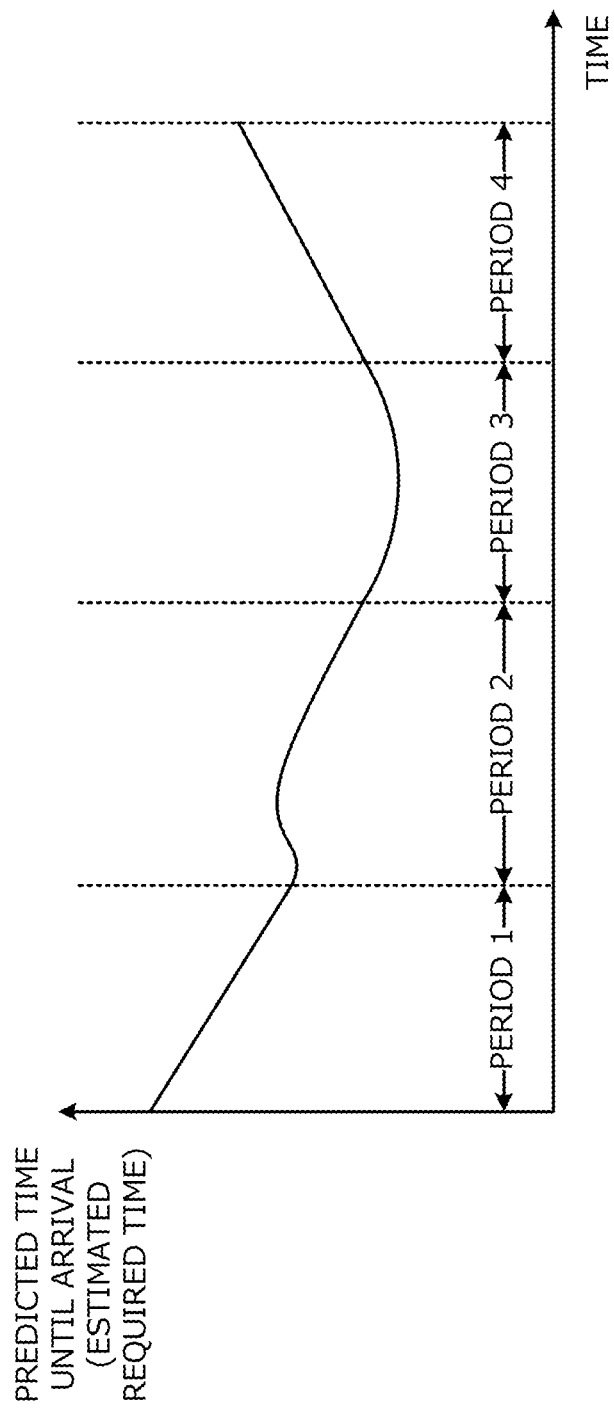
FIG. 7 is a diagram describing a method for determining a deviation from a route.

An increase/decrease in the estimated required time will now be described. FIG. 7 is a diagram illustrating the estimated required time that changes with a lapse of time. The estimated required time until a destination (alighting location) is reached is decreased as the vehicle moves closer to the destination. Accordingly, in the case where the estimated required time is monotonously decreased with a lapse of time, as in period 1, the vehicle is estimated to be smoothly traveling toward the destination.

In the case where the estimated required time is temporarily increased and is then decreased, as in period 2, it is estimated that the travel route is rerouted.

In the case where the estimated required time stops to be decreased, as in period 3, a direction of traveling of the vehicle is estimated to be changing from a direction of moving closer to the destination to a direction of moving away from the destination.

Furthermore, in the case where the estimated required time is increased with a lapse of time, as in period 4, the vehicle is estimated to be traveling in a direction of moving away from the destination.

In this manner, whether the vehicle is traveling toward a destination or not may be determined based on the rate of increase/decrease in the estimated required time until the destination (alighting location) is reached.

Figure 8:
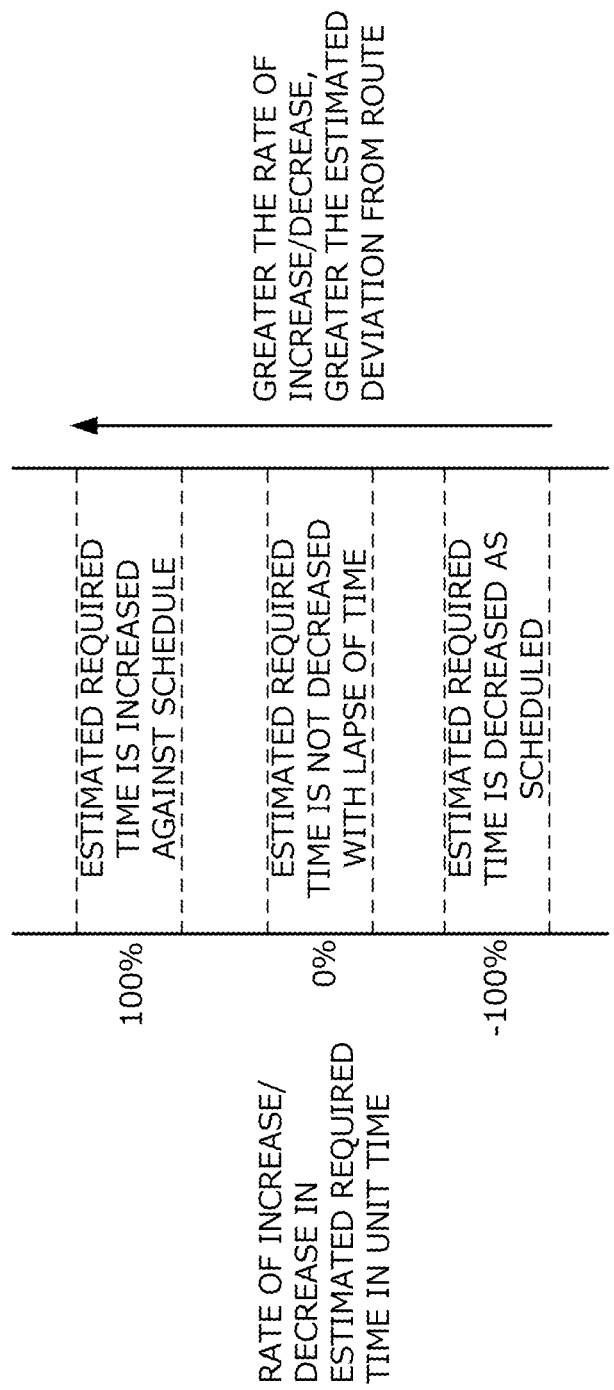
FIG. 8 is a diagram describing the method for determining a deviation from a route.

In the first embodiment, whether the vehicle is traveling along a predetermined scheduled travel route or not is determined based on the rate of increase/decrease in the estimated required time in unit time (such as three minutes, five minutes, or ten minutes). FIG. 8 is a diagram describing the rate of increase/decrease in the estimated required time in unit time. As illustrated in the drawing, a deviation of the vehicle from the scheduled travel route is estimated to be greater, the greater the rate of increase/decrease in the estimated required time in unit time.

In step S14, the rate of increase/decrease in the estimated required time in unit time is calculated. For example, in the case where the estimated required time is decreased by five minutes over a lapse of five minutes, the rate of increase/decrease is −100%. Additionally, the rate of increase/decrease may also be calculated for each of a plurality of time units, and a representative value (such as a mean value) may be acquired. A value determined in this manner is a value representing the degree of deviation from the scheduled travel route.

Next, in step S15, whether the calculated rate of increase/decrease exceeds a first threshold or not is determined. The first threshold is a threshold for notifying the driver user of a small deviation from a route in a case such a deviation is estimated. For example, in the case where the first threshold is "0%", a positive determination is made when the rate of increase/decrease exceeds 0% (i.e., when the rate takes a positive value).

In the case where the calculated rate of increase/decrease exceeds the first threshold, whether the calculated rate of increase/decrease exceeds a second threshold or not is determined in step S16. The second threshold is a threshold for notifying the administrator of a great deviation from the route in a case such a deviation is estimated. For example, in the case where the second threshold is "+50%", a positive determination is made when the rate of increase/decrease exceeds 50%.

In the case where the calculated rate of increase/decrease exceeds the first threshold but does not exceeds the second threshold, a notification is issued to the user terminal 10 in step S18. Specifically, a notification indicating that the first threshold is exceeded is transmitted to the user terminal 10B possessed by the driver user, and the notification unit 1014 of the user terminal 10B issues a notification indicating that the vehicle is not traveling as planned.

The first threshold is a threshold for notifying of a small deviation. Accordingly, for example, in a case where the driver user takes a wrong route, the driver user is enabled to grasp such a situation by the notification, and may be urged to return to the original route.

On the other hand, in the case where the calculated rate of increase/decrease exceeds both the first threshold and the second threshold, a notification is issued to the system administrator in step S17. Specifically, an alarm is output via the notification unit 2013 as a notification indicating that the vehicle is not traveling as planned.

The second threshold is a threshold for notifying of a great deviation. If the route is not corrected in response to the notification issued in step S18, a notification is issued to the system administrator.

Additionally, in step S17, the notification may be issued only to the system administrator, or may be issued also to the user on board the vehicle. For example, the notification may be issued to the user terminals 10 possessed by the driver user and the passenger user. The driver user may thus be urged to contact the system administrator.

As described above, in the ride-sharing system according to the first embodiment, the degree of deviation from the scheduled route is calculated by checking the scheduled travel route against the current position of the vehicle, and a notification is issued to different devices depending on whether the degree of deviation is small or great. Such a configuration enables an operation according to which a notification is issued only to the driver user in the case of a small deviation, and an alarm is issued only in the case when there is occurrence of an utter deviation. A burden on the driver user may be reduced, especially because a notification may be received before occurrence of an utter deviation is determined.

Additionally, in the present embodiment, a notification is issued in step S18 to the user terminal 10B possessed by the driver user, but the notification may alternatively be issued to the user terminal 10A possessed by the passenger user. Moreover, the notification may be transmitted to an in-vehicle terminal provided in the vehicle.

Furthermore, in the present embodiment, an estimated required time until a location where the passenger user alights is reached is calculated, but a remaining distance to the alighting location may be calculated instead to be used for determination. Other values may also be used as long as whether or not the vehicle is moving closer to the alighting location as planned may be determined.

Example Modification 1 of First Embodiment

In the first embodiment, the route check unit 2012 of the server device 20 checks the route of the vehicle, but checking of the route may alternatively be performed by the user terminal 10A possessed by the passenger user or the user terminal 10B possessed by the driver user.

For example, the user terminal 10 may check the scheduled travel route included in the matching information against the position information that is periodically acquired by the position acquisition unit 105, and may calculate the degree of deviation from the route. That is, the process illustrated in FIG. 6 may be performed by the user terminal 10. In this case, information about the thresholds may be included in the matching information to be transmitted from the server device 20 to the user terminal 10. Moreover, the estimated required time may be calculated using an external service.

In the present example modification, in the case where the rate of increase/decrease in the estimated required time exceeds the first threshold but does not exceed the second threshold, the user terminal 10 issues a notification through the notification unit 1014. In the case where the rate of increase/decrease in the estimated required time exceeds both the first threshold and the second threshold, the server device 20 is notified of such a state, and the notification unit 2013 of the server device 20 outputs an alarm.

Example Modification 2 of First Embodiment

In the first embodiment, a deviation from a route is determined based on the rate of increase/decrease in the estimated required time until the destination (alighting location) is reached, but determination may also be performed by other methods. For example, a route already traveled (travel route past record) may be generated based on the position information of the vehicle that is periodically acquired, and a degree of coincidence between the travel route past record and the scheduled travel route may be calculated, and occurrence of a deviation may be determined in the case where the degree of coincidence is below a predetermined threshold.

Moreover, a distance between the position of the vehicle and the scheduled travel route may be calculated, and occurrence of a deviation may be determined based on the distance. For example, occurrence of a deviation may be determined in the case where a state where the distance between the position of the vehicle and the scheduled travel route exceeds a threshold continues longer than a predetermined time period.

Additionally, also in these example modifications, two thresholds are desirably set, and a notification is desirably issued by a different method (or to a different device) for each threshold.

Example Modification

The embodiment described above is merely an example, and the present disclosure may be embodied while being changed within the scope of the gist of the disclosure as appropriate.

In the description of the embodiment, a mode in which the driver user drives the vehicle is illustrated, but the vehicle which the passenger user is to board may be an autonomous car.

Furthermore, in the description of the embodiment, notifications are transmitted to different devices in steps S17 and S18, but the notifications may be transmitted to a same device. In this case, notifications may be issued by different methods (such as by display and by an alarm sound) in respective cases. Moreover, in the case of transmitting notifications to different devices in steps S17 and S18, transmission destinations of the notifications are not limited to the devices illustrated above.

Furthermore, in the description of the embodiment, in the case where there is a deviation of the vehicle from the scheduled travel route, a notification is issued, but in a situation where there is no occurrence of deviation, a notification of such a situation may also be issued. Such a configuration may allow the user to feel secure.

A configuration may be introduced according to which a notification is transmitted from the user terminal 10 to the server device 20 in a case where the passenger user feels insecure. According to such a configuration, the system administrator may contact the driver user to check the situation, for example.

Processes and means described in the present disclosure may be freely combined to the extent that no technical conflicts exist.

Moreover, a process that is described to be performed by one device may be performed, shared among a plurality of devices. Processes that are described to be performed by different devices may be performed by one device. Which function is to be implemented by which hardware component (server component) in a computer system may be flexibly changed.

The present disclosure may also be implemented by supplying computer programs for implementing the functions described in the embodiment above to a computer, and one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), read only memories (ROMs), random access memories (RAMs), EPROMs, EEPROMs, magnetic cards, flash memories, optical cards, and any type of medium suitable for storing electronic instructions.

What is claimed is:

1. An information processing apparatus comprising a control unit configured to:
   acquire information about a predetermined travel route of a vehicle that travels with a plurality of users on board;
   acquire a current position of the vehicle;
   acquire a degree of deviation, which is a value indicating a degree of deviation of the vehicle from the predetermined travel route;

compare the current position of the vehicle and the predetermined travel route against each other;

perform, based on whether the degree of deviation exceeds a predetermined threshold or not, determination as to whether the vehicle is traveling along the predetermined travel route or not; and issue a notification to a predetermined device, in a case where a deviation of the vehicle from the predetermined travel route is determined, wherein:

the predetermined threshold includes a first threshold and a second threshold higher than the first threshold, and in a case where the degree of deviation is at or higher than the first threshold and lower than the second threshold, the control unit determines that the vehicle is in a first state, and in a case where the degree of deviation is at or higher than the second threshold, the control unit determines that the vehicle is in a second state.

2. The information processing apparatus according to claim 1, wherein the predetermined device is any one of a mobile terminal possessed by the user, an in-vehicle terminal provided in the vehicle, and a server device that manages the vehicle.

3. The information processing apparatus according to claim 1, wherein the control unit issues a notification to the predetermined device by a different method between a case where the vehicle is in the first state and a case where the vehicle is in the second state.

4. The information processing apparatus according to claim 1, wherein the control unit transmits the notification to a different device between a case where the vehicle is in the first state and a case where the vehicle is in the second state.

5. The information processing apparatus according to claim 4, wherein the control unit transmits the notification to a terminal that is possessed by a driver of the vehicle, in a case where the vehicle is in the first state.

6. The information processing apparatus according to claim 1, wherein the degree of deviation is calculated based on a rate of increase/decrease in an estimated required time until an alighting location of the user, present on the predetermined travel route, is reached.

7. An information processing method for causing an information processing apparatus to perform the steps of:

acquiring information about a predetermined travel route of a vehicle that travels with a plurality of users on board;

acquiring a current position of the vehicle;

acquiring a degree of deviation, which is a value indicating a degree of deviation of the vehicle from the predetermined travel route;

comparing the current position of the vehicle and the predetermined travel route against each other;

performing, based on whether the degree of deviation exceeds a predetermined threshold or not, determination as to whether the vehicle is traveling along the predetermined travel route or not; and issuing a notification to a predetermined device, in a case where a deviation of the vehicle from the predetermined travel route is determined, wherein:

the predetermined threshold includes a first threshold and a second threshold higher than the first threshold, and in a case where the degree of deviation is at or higher than the first threshold and lower than the second threshold, the method further comprises determining that the vehicle is in a first state, and in a case where the degree of deviation is at or higher than the second threshold, the method further comprises determining that the vehicle is in a second state.

8. A non-transitory computer readable storing medium recording a computer program for causing a computer to perform an information processing method comprising the steps of:

acquiring information about a predetermined travel route of a vehicle that travels with a plurality of users on board;

acquiring a current position of the vehicle;

acquiring a degree of deviation, which is a value indicating a degree of deviation of the vehicle from the predetermined travel route;

comparing the current position of the vehicle and the predetermined travel route against each other;

performing, based on whether the degree of deviation exceeds a predetermined threshold or not, determination as to whether the vehicle is traveling along the predetermined travel route or not; and issuing a notification to a predetermined device, in a case where a deviation of the vehicle from the predetermined travel route is determined, wherein:

the predetermined threshold includes a first threshold and a second threshold higher than the first threshold, and in a case where the degree of deviation is at or higher than the first threshold and lower than the second threshold, the performed method further comprises determining that the vehicle is in a first state, and in a case where the degree of deviation is at or higher than the second threshold, the performed method further comprises determining that the vehicle is in a second state.

* * * * *